(12) United States Patent
Hans et al.

(10) Patent No.: US 10,681,863 B2
(45) Date of Patent: Jun. 16, 2020

(54) AUTONOMOUS MOBILE GREEN AREA MAINTENANCE ROBOT

(71) Applicant: Andreas Stihl AG & Co. KG, Waiblingen (DE)

(72) Inventors: Matthias Hans, Kiefersfelden (DE); Holger Lochmann, Waiblingen (DE); Andreas Totschnig, St. Johann in Tirol (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 202 days.

(21) Appl. No.: 16/003,740

(22) Filed: Jun. 8, 2018

(65) Prior Publication Data

US 2018/0352732 A1 Dec. 13, 2018

(30) Foreign Application Priority Data

Jun. 9, 2017 (EP) ..................................... 17175380

(51) Int. Cl.
*A01D 34/00* (2006.01)
*A01D 34/84* (2006.01)
(Continued)

(52) U.S. Cl.
CPC ......... *A01D 34/008* (2013.01); *A01D 34/006* (2013.01); *A01D 34/416* (2013.01);
(Continued)

(58) Field of Classification Search
CPC .... A01D 34/006; A01D 34/008; A01D 34/84; A01D 43/16
See application file for complete search history.

(56) References Cited

U.S. PATENT DOCUMENTS 5,572,856 A 11/1996 Ku
6,009,358 A * 12/1999 Angott ................. A01D 34/008
180/168

(Continued)

FOREIGN PATENT DOCUMENTS

CN 104 704 980 A 6/2015
DE 10 2006 038 553 A1 2/2008
(Continued)

*Primary Examiner* — Alicia Torres
(74) *Attorney, Agent, or Firm* — Crowell & Moring LLP

(57) ABSTRACT

A autonomous mobile green area maintenance robot, includes: a first motor-driven treatment tool, a second motor-driven treatment tool differing from the first treatment tool, and an open protective housing with a lateral rim. The first treatment tool defines a first treatment zone and is arranged within the protective housing such that the first treatment zone is located in a safety zone of the protective housing. The safety zone has a safety distance to the lateral rim. The second treatment tool defines a second treatment zone, wherein the second treatment zone is located at least partially beyond the safety zone. The autonomous mobile green area maintenance robot has an autonomous operation mode, wherein in the autonomous operation mode, a maximum kinetic energy of the second motor-driven treatment tool is smaller than a maximum kinetic energy of the first motor-driven treatment tool.

12 Claims, 2 Drawing Sheets

(51) Int. Cl.
*A01D 43/16* (2006.01)
*A01D 34/416* (2006.01)
*A01D 34/685* (2006.01)
*A01D 34/66* (2006.01)
*G05D 1/00* (2006.01)
*G05D 1/02* (2020.01)
*A01D 101/00* (2006.01)

(52) U.S. Cl.
CPC ........... *A01D 34/66* (2013.01); *A01D 34/685* (2013.01); *A01D 34/84* (2013.01); *A01D 43/16* (2013.01); *G05D 1/0088* (2013.01); *G05D 1/0225* (2013.01); *G05D 1/0227* (2013.01); *A01D 2101/00* (2013.01); *G05D 2201/0208* (2013.01)

(56) References Cited

U.S. PATENT DOCUMENTS

| | | |
|---|---|---|
| 6,076,265 A | 6/2000 | Huang Lo |
| 6,474,053 B1 | 11/2002 | Lund |
| 2002/0156556 A1 | 10/2002 | Ruffner |
| 2006/0010844 A1 | 1/2006 | Angott |
| 2007/0294991 A1 | 12/2007 | Medina et al. |
| 2014/0102061 A1 | 4/2014 | Sandin et al. |

FOREIGN PATENT DOCUMENTS

| | | |
|---|---|---|
| EP | 1 016 946 A1 | 7/2000 |
| GB | 2 334 875 A | 9/1999 |
| WO | WO 2011/115536 A1 | 9/2011 |

* cited by examiner

AUTONOMOUS MOBILE GREEN AREA MAINTENANCE ROBOT

CROSS REFERENCE TO RELATED APPLICATIONS

This application is claims priority under 35 U.S.C. § 119 from European Patent Application No. 17 175 380.9, filed Jun. 9, 2017, the entire disclosure of which is herein expressly incorporated by reference.

BACKGROUND AND SUMMARY OF THE INVENTION

The invention relates to an autonomous mobile green area maintenance robot.

An autonomous mobile lawn mower robot is known.

The invention is based on the object of providing an autonomous mobile green area maintenance robot which has improved properties, in particular more functions.

The invention achieves this object by providing an autonomous mobile green area maintenance robot in accordance with claimed embodiments of the invention. Advantageous refinements and/or design embodiments of the invention are described and claimed herein.

The autonomous mobile green area maintenance robot according to the invention has a first motor-driven treatment tool, a second motor-driven treatment tool, and an open protective housing, in particular open at the bottom, with a lateral rim. The second motor-driven treatment tool is different from the first treatment tool. The first treatment tool defines a first treatment zone and is disposed within the protective housing in such a manner that the first treatment zone is located, in particularly completely, in a safety zone of the protective housing. The safety zone has a safety distance, in particular a minimum safety distance, from the lateral rim. The second treatment tool defines a second treatment zone. The second treatment zone is located at least partially, in particular completely, outside the safety zone. The autonomous mobile green area maintenance robot has an autonomous operation mode. In the autonomous operation mode, a maximum kinetic energy of the second motor-driven treatment tool is, in particular relatively, smaller than a maximum kinetic energy of the first motor-driven treatment tool.

Since the safety zone has the safety distance from the lateral rim, a tool which is potentially dangerous to human beings or animals and which has a maximum kinetic energy that is relatively larger than that of the first motor-driven treatment tool can be disposed in the safety zone. The protective housing and/or the safety distance can guarantee that, in the case of contact between the green area maintenance robot and a human being or an animal, said human being or animal cannot readily come into contact with the first treatment tool that is disposed in the safety zone. The safety zone can be referred to as the risk zone. The maximum kinetic energy of the second motor-driven treatment tool in the autonomous operation mode can be referred to as limited.

In particular, in the autonomous operation mode, in particular for the entire duration or time, respectively, of the autonomous operation mode, a limit, or an upper limit, respectively, of the maximum kinetic energy of the second motor-driven treatment tool, in particular in the case of an operation, or driving operation, respectively, or an activation, respectively, of the second motor-driven treatment tool can be, in particular be predefined or established so as to be smaller, than a limit, or an upper limit, respectively, of the maximum kinetic energy of the first motor-driven treatment tool, in particular in the case of an operation, or driving operation, respectively, or an activation, respectively, of the first motor-driven treatment tool. In other words, in the autonomous operation mode, in particular for the entire duration or time, respectively, of the autonomous operation mode, the maximum kinetic energy of the second motor-driven treatment tool can be unequal to and not larger than the maximum kinetic energy of the first motor-driven treatment tool.

The arrangement of the first motor-driven treatment tool in the safety zone, and the smaller maximum kinetic energy of the second motor-driven treatment tool, enable, allow, and/or permit the autonomous operation mode of the autonomous mobile green area maintenance robot. The autonomous operation mode can be referred to as the autonomous operating mode.

The autonomous mobile green area maintenance robot enables an autonomous treatment of an area to be treated by means of the first motor-driven treatment tool of said autonomous mobile green area maintenance robot. Additionally, the green area maintenance robot by means of the second motor-driven treatment tool thereof can enable an autonomous treatment of the area, in particular treatment of a peripheral region and/or of an edge region of the area, in such a manner as cannot and/or must not be possible, allowed, and/or permitted by means of the first treatment tool.

The area to be treated can be, for example, a free space, in particular unsealed soil, or a green area such as a meadow with a lawn. A lawn periphery and/or a lawn edge can advantageously be treated by means of the second treatment tool.

The first motor-driven treatment tool can comprise or be a first motor-driven cutting tool. Accordingly, the first treatment zone can be referred to as the first cutting zone. The second motor-driven treatment tool can comprise or be a second motor-driven cutting tool. Accordingly, the second treatment zone can be referred to as the second cutting zone. The first treatment zone can be defined by an end of the first treatment tool. The second treatment zone can be defined by an end of the second treatment tool. The protective housing can be referred to as the treatment tool cover. Open may mean that a treatment of the area to be treated can be possible by means of the first treatment tool.

Autonomously treating can mean that the autonomous mobile green area maintenance robot can be configured to move and/or act on the area to be treated which may be predefined, and/or in the environment of said autonomous mobile green area maintenance robot, and/or to select at least one parameter such as, in particular, a path parameter and/or a reversal point in an autonomous, self-acting, self-determined, self-controlled manner, and/or independently of a user. Additionally or alternatively, autonomously treating can mean that the green area maintenance robot can be configured to autonomously start a treatment and/or terminate the treatment. The green area maintenance robot in the autonomous operating mode does not have to be controlled by the user, in particular not in the remote-controlled manner. In other words, the green area maintenance robot in the autonomous operating mode can operate in particular without any human control and/or guidance. The autonomous mobile green area maintenance robot can be referred to as a service robot and/or a service provider robot.

Additionally, the autonomous mobile green area maintenance robot can have at least one lifting and/or tilting sensor, wherein the lifting and/or tilting sensor can be configured to detect any lifting and/or any tilting of the green area maintenance robot. The green area maintenance robot can be configured to render the first treatment tool and/or the second treatment tool inoperative, depending on any detected lifting and/or tilting.

Furthermore additionally or alternatively, the autonomous mobile green area maintenance robot can have at least one obstacle sensor, wherein the obstacle sensor can be configured for detecting an obstacle. The green area maintenance robot can be configured to render the first treatment tool and/or the second treatment tool inoperative, depending on any detected obstacle. The obstacle can be, for example, a human being and/or an animal.

Furthermore additionally or alternatively, the autonomous mobile green area maintenance robot can be configured in such a manner that the first motor-driven treatment tool takes evasive action when touching and/or contacting an obstacle.

In a refinement of the invention the first motor-driven treatment tool and/or the second motor-driven treatment tool in each case comprise/comprises at least one mowing line, at least one plastic knife, at least one metallic knife, and or a metallic cutting blade having at least one cutting edge and/or having at least one cutting tooth. This can enable mowing of grass, herbaceous plants, woody undergrowth, or comparatively small shrubs by means of the first treatment tool and/or of the second treatment tool. The first treatment tool and/or the second treatment tool can in each case be referred to as a lawn mowing tool. The green area maintenance robot can be referred to as a lawn mower robot; the green area maintenance robot can in particular be configured as a mulching mower robot.

In a refinement of the invention the first motor-driven treatment tool and/or the second motor-driven treatment tool in each case are/is configured as a rotating treatment tool. A respective rotation zone can be the corresponding treatment zone. The first treatment tool and/or the second treatment tool can in each case be configured to treat the product to be treated by the so-called free-cutting method, without a counter blade, in particular to generate a cutting procedure by way of the centrifugal force of the respective treatment tool. The respective kinetic energy can be referred to as a rotation energy.

In a refinement of the invention the safety distance is at least 4 centimetres (cm), in particular at least 8 cm, advantageously at least 15 cm.

In a refinement of the invention the maximum kinetic energy of the second motor-driven treatment tool in the autonomous operation mode is in a limit range from 5 to 25 Joule. The maximum kinetic energy of the second motor-driven treatment tool can in particular be at maximum 10 Joule.

The limit of the maximum kinetic energy of the second motor-driven treatment tool, in particular in the autonomous operation mode, can lie, in particular be established, in the limit range from 5 to 25 Joule. The limit of the maximum kinetic energy of the second motor-driven treatment tool can in particular be at maximum 10 Joule.

In a refinement of the invention the autonomous mobile green area maintenance robot is configured in such a manner that the second motor-driven treatment tool takes evasive action when touching and/or contacting an obstacle. The second treatment tool can advantageously be configured so as to be elastic. Additionally or alternatively, a receptacle of the second treatment tool can be configured so as to be elastic, flexible, and/or resilient. Furthermore additionally or alternatively, a drive shaft of the second treatment tool can be configured so as to be elastic.

In a refinement the autonomous mobile green area maintenance robot has a boundary edge detection device and a control unit. The boundary edge detection device is configured to detect a boundary edge of the area to be treated. The control unit is configured to cooperate with the boundary edge detection device and, in particular in the autonomous operation mode, to control a movement of the green area maintenance robot on the area to be treated, in particular so as to depend on a detection of the boundary edge, in such a manner that the green area maintenance robot remains on the area to be treated, in particular within the boundary edge.

In one design embodiment of the invention the control unit, in particular in the autonomous operation mode, is configured to activate driving of the second motor-driven treatment tool upon detection of the boundary edge, and otherwise to deactivate driving of the second treatment tool. This enables any unnecessary driving of the second treatment tool to be avoided. The second treatment tool needs to be driven only where this can be of interest. This can reduce an energy consumption of the green area maintenance robot. The second treatment tool can advantageously only be driven within a distance of 2 metres (m), in particular within a distance of 1 m, from the boundary edge. Deactivating can mean that the second treatment tool can be decoupled from a drive motor, that the drive motor can be decoupled from a drive energy source, and/or can be non-activated.

In one design embodiment of the invention the boundary edge detection device comprises at least one magnetic field sensor. Additionally or alternatively, the boundary edge detection device comprises a satellite position determination receiver, in particular for determining position coordinates. Furthermore additionally or alternatively, the boundary edge detection device comprises a local positioning system device, in particular for determining position coordinates. The area to be treated can in particular be surrounded by a boundary wire, wherein an electric current can flow through the boundary wire, wherein the electric current can generate a distance-dependent magnetic field in the area. The boundary wire can define the boundary edge. The magnetic field sensor can be configured to detect the magnetic field and thus the boundary edge, in particular within a maximum distance from the boundary edge and/or from the boundary wire. The satellite position determination receiver can advantageously be configured for one or a plurality of satellite position determination systems such as NAVSTAR GPS, GLONASS, Galileo, and/or BeiDou. The local positioning system device can advantageously be based on one or a plurality of different technologies such as distance measurements from hubs, optical signals, radio waves, magnetic fields, acoustic signals, ultra-wideband, Bluetooth, WLAN, ultrasound, and/or RFID. The local positioning system device can in particular be a receiver and/or a transmitter. Additionally or alternatively, the local positioning system device can be an active element and/or a passive element. In particular, a sequence of boundary edge coordinates of the boundary edge can be stored in the boundary edge detection device.

In a refinement of the invention the autonomous mobile green area maintenance robot has a user control device, a user-controlled operation mode, and an operation mode switching device for switching, in particular automatically, between the autonomous operation mode and the user-controlled operation mode. The green area maintenance robot, in the user-controlled operation mode, by way of the first motor-driven treatment tool of the former, and of the second motor-driven treatment tool of the former, is controlled by the user by means of the user control device, and the maximum kinetic energy of the second motor-driven treatment tool is, in particular relatively, larger than in the autonomous operation mode. The larger kinetic energy of the second treatment tool can enable the area to be treated to be treated in such a manner as cannot and/or must not be possible, allowed, and/or permitted in the autonomous operation mode. Be controlled can mean that a movement of the green area maintenance robot, driving of the first treatment tool and/or driving of the second treatment tool can be controlled. The user-controlled operation mode can be referred to as a user control mode and/or a controlled and/or manual operation mode.

In particular in the user-controlled operation mode, in particular for the entire duration or time, respectively, of the user-controlled operation mode, the limit of the maximum kinetic energy of the second motor-driven treatment tool, in particular in the operation, or the driving, respectively, or the activation, respectively, of the second motor-driven treatment tool can be larger than in the autonomous operation mode. In other words, in the autonomous operation mode, in particular for the entire duration or time, respectively, of the autonomous operation mode, the maximum kinetic energy of the second motor-driven treatment tool can be unequal to and not larger than in the user-controlled operation mode.

In one design embodiment the maximum kinetic energy of the second motor-driven treatment tool in the user-controlled operation mode is above a limit range of 5 to 25 Joule. In particular, the maximum kinetic energy of the second motor-driven treatment tool can be larger than 10 Joule.

In the user-controlled operation mode the limit of the maximum kinetic energy of the second motor-driven treatment tool can in particular be, or be established, above the limit range of 5 to 25 Joule. In particular, the limit of the maximum kinetic energy of the second motor-driven treatment tool can be larger than 10 Joule.

In one design embodiment of the invention the autonomous mobile green area maintenance robot has a drive motor. The second motor-driven treatment tool is driven by means of the drive motor. The operation mode switching device is configured to, in particular relatively, throttle and/or lower, or to reduce, respectively, a maximum available drive power of the drive motor when switching from the user-controlled operation mode to the autonomous operation mode. The operation mode switching device can advantageously be configured to, in particular relatively, enhance, or to increase, respectively, a maximum available drive power of the drive motor when switching from the autonomous operation mode to the user-controlled operation mode.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
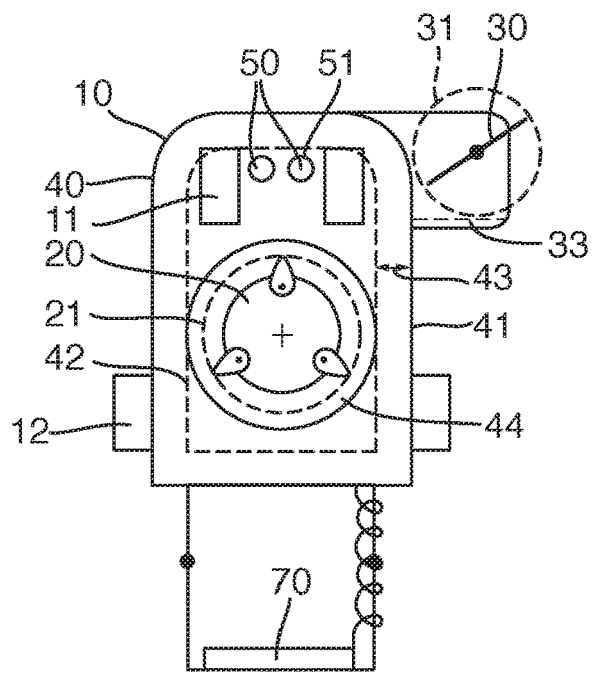
FIG. 1 shows a view of an autonomous mobile green area maintenance robot according to an embodiment of the invention from below.
Figure 2:
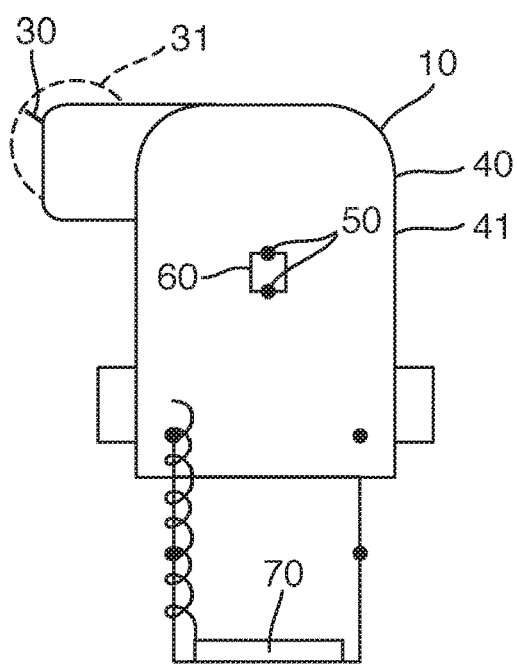
FIG. 2 shows a plan view of the green area maintenance robot of FIG. 1.

FIGS. 1 to 5 show an autonomous mobile green area maintenance robot 10. The green area maintenance robot 10 has a first motor-driven treatment tool 20, a second motor-driven treatment tool 30, and a protective housing 40, open at the bottom in FIGS. 3 and 4, having a lateral rim 41. In detail, the lateral rim 41 is an external rim of an end of a wall of the protective housing 40. The second treatment tool 30 is different from the first treatment tool 20. The first treatment tool 20 defines a first treatment zone 21. The first treatment tool 20 is disposed in the protective housing 40 in such a manner that the first treatment zone 41 is located, in particular completely, in a safety zone 42 of the protective housing 40. In the exemplary embodiment shown the first treatment tool 20 is disposed in a receptacle space 44 that is defined by the protective housing 40, said receptacle space 44 being in particular bell-shaped as can be seen in FIG. 1. The safety zone 42 has a safety distance 43 from the lateral rim 41, in detail of at least 8 cm. The second treatment tool 30 defines a second treatment zone 31. The second treatment zone 31 is located at least partially, in the exemplary embodiment shown completely, outside the safety zone 42. In the exemplary embodiment shown, the second treatment tool 30 is disposed so as to be laterally completely outside the lateral rim 41 of the protective housing 40, as can be seen in FIG. 1 on the right-hand front, and in FIG. 2 on the left-hand front. The autonomous mobile green area maintenance robot 10 has an autonomous operation mode. In the autonomous operation mode a maximum kinetic energy Ekin2 of the second motor-driven treatment tool 30 is smaller than a maximum kinetic energy Ekin1 of the first motor-driven treatment tool 20. In detail, the maximum kinetic energy Ekin2 of the second treatment tool 30 in the autonomous operation mode is limited to at maximum 10 Joule.

The protective housing 40 and the safety distance 43 guarantee that in the case of contact between the autonomous mobile green area maintenance robot 10 and a human being or an animal, said human being or said animal cannot readily come into contact with the first treatment tool 20 that is disposed in the safety zone 42. The arrangement of the first motor-driven treatment tool 20 in the safety zone 42, and the relatively small maximum kinetic energy Ekin2 of the second motor-driven treatment tool 30, enable the autonomous operation mode of the autonomous mobile green area maintenance robot 10. The green area maintenance robot 10 enables an autonomous treatment of an area 100 to be treated by means of the first treatment tool 20 of said green area maintenance robot 10 said area 100 in the form of a meadow with the lawn being shown in FIG. 5. Additionally, the green area maintenance robot 10 enables an autonomous treatment of the area 100 in particular at a boundary edge 101 in the form of a lawn edge, by means of the second treatment tool 30 of said green area maintenance robot 10, as can be seen at the right-hand bottom in FIG. 5. Treatment of the area 100 at the boundary edge 101 by means of the first treatment tool 20, by virtue of the arrangement of the first treatment tool 20 together with the first treatment zone 21 thereof in the safety zone 42 of the protective housing 40, can be prevented or rendered impossible by way of the safety distance 43. This can be the case in particular when the boundary edge 101 is defined by a boundary wall and/or a boundary fence.

In detail, the autonomous mobile green area maintenance robot 10 is configured as a lawn mower robot, in particular as a mulching mower robot. In the exemplary embodiment shown, the first treatment tool 20 comprises a metallic cutting blade having three cutting teeth. In alternative exemplary embodiments, the first treatment tool can comprise only a single cutting tooth, or two or more than three cutting teeth. The first treatment tool 20 is configured as a rotating treatment tool and is configured to treat the area 100 by the free-cutting method, in particular to generate a cutting procedure by way of a centrifugal force of the first treatment tool 20. The first treatment tool 20, or an end or an outermost point of one of the cutting teeth, respectively, defines the first treatment zone 21, in the exemplary embodiment shown a circular first treatment zone. Furthermore, the autonomous mobile green area maintenance robot 10, or the first treatment tool 20 thereof, respectively, is configured in such a manner that the first treatment tool 20, or the cutting teeth thereof, respectively, takes evasive action when contacting an obstacle.

The second treatment tool 30 comprises a mowing line from nylon. The second treatment tool 30 is configured as a rotating treatment tool and is configured to treat the area 100, or the boundary edge 101 thereof, respectively, by the free-cutting method, in particular to generate a cutting procedure by way of a centrifugal force of the second treatment tool 30. The second treatment tool 30, or an end or an outermost point of the mowing line, respectively, defines the second treatment zone 31, in the exemplary embodiment shown a circular second treatment zone. Furthermore, the autonomous mobile green area maintenance robot 10, or the second treatment tool 30 thereof, respectively, is configured in such a manner that the second treatment tool 30, or the mowing line thereof, respectively, takes evasive action when contacting an obstacle.

Figure 4:
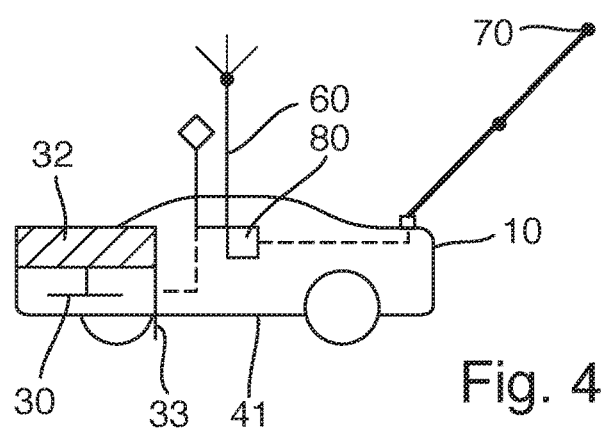
FIG. 4 shows a further side view of the green area maintenance robot of FIG. 1.
Figure 5:
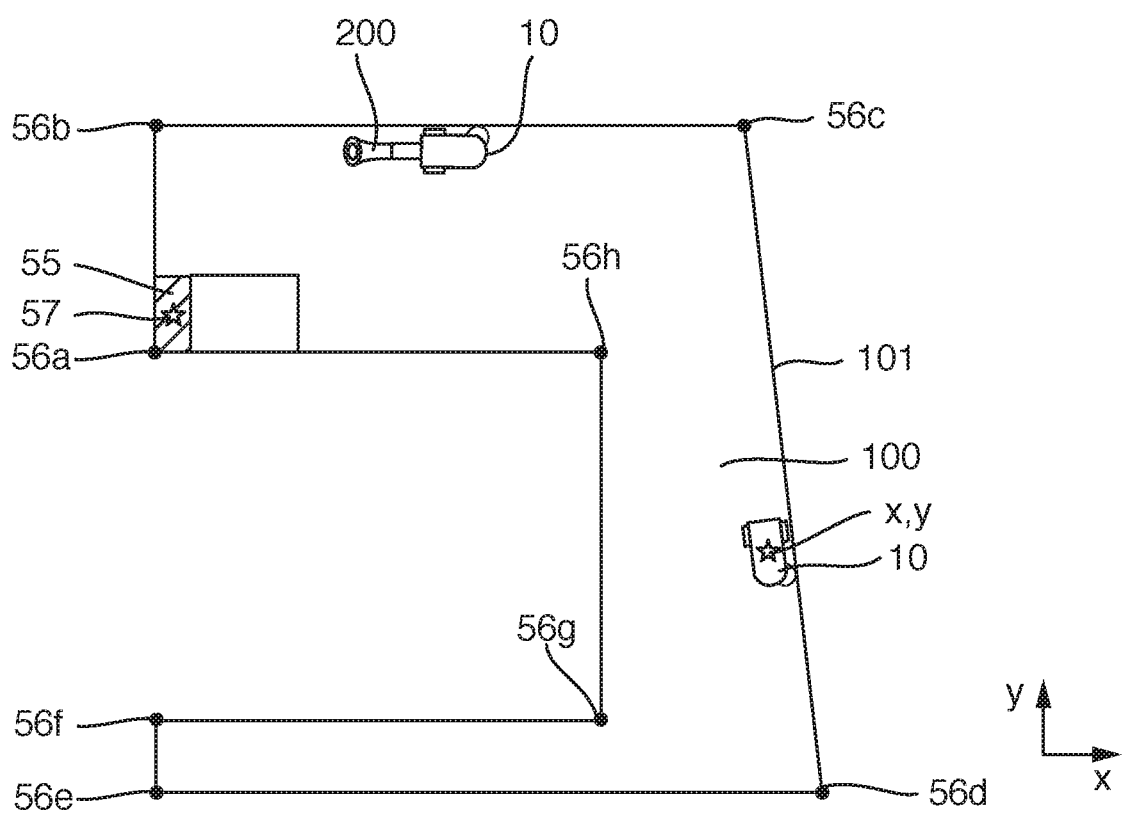
FIG. 5 shows a plan view of an area to be treated by means of the green area maintenance robot of FIG. 1.

Moreover, the autonomous mobile green area maintenance robot 10 has a boundary edge detection device 50 and a control unit 60. The boundary edge detection device 50 is configured to detect the boundary edge 101. The control unit 60 is configured to cooperate with the boundary detection device 50, as is indicated by dashed lines in FIGS. 3 and 4, and, in particular in the autonomous operation mode, to control a movement of the green area maintenance robot 10 on the area 100 to be treated, in particular so as to depend on a detection of the boundary edge 101, in such a manner that the green area maintenance robot 10 remains on the area 100, in particular within the boundary edge 101, as can be seen in FIG. 5.

In detail, the control unit 60, in particular in the autonomous operation mode, is configured to activate driving of the second motor-driven treatment tool 30 upon detection of the boundary edge 101, in particular so as to be only within a distance of 1 m from the boundary edge 101, and otherwise to deactivate driving of the second treatment tool 30.

The boundary edge detection device 50 comprises two magnetic field sensors 51. In alternative exemplary embodiments the boundary edge detection device can comprise only a single magnetic field sensor or at least three magnetic field sensors. In the exemplary embodiment shown the area 100 is surrounded by a boundary wire, wherein an electric current flows through the boundary wire, wherein the electric current generates a distance-dependent magnetic field in the area 100. The boundary wire defines the boundary edge 101. The magnetic field sensors 51 are configured to detect the magnetic field and thus the boundary edge 101, in particular within the distance of 1 m from the boundary edge 101, or the boundary wire, respectively. In detail, the two magnetic field sensors 51 are disposed in the green area maintenance robot 10 in such a manner that the boundary edge detection device 50 and/or the control unit 60 can determine an orientation of the green area maintenance robot 10 to any detected closest portion of the boundary wire, and that the control unit 60 can control the movement of the green area maintenance robot 10 in a corresponding manner.

The boundary edge detection device 50 additionally comprises a satellite position determination receiver 52, in particular for determining position coordinates x, y. A sequence of boundary edge coordinates of the boundary edge 101 is stored in the boundary edge detection device 50. In the exemplary embodiment shown a further satellite position determination receiver 57 is present, the latter being disposed so as to be stationary in the region of the area 100, as can be seen in FIG. 5. The satellite position determination receiver 52 and the further satellite position determination receiver 57 are configured to be interconnected by signals so as to enable a relatively exact determination of a position.

Furthermore, the boundary edge detection device 50 additionally comprises a local positioning system device 53, in particular for determining position coordinates x, y. A sequence of boundary edge coordinates of the boundary edge 101 is stored in the boundary edge detection device 50. The local positioning system device 53 in the exemplary embodiment shown is a passive element. Furthermore present are active elements 56a, b, c, d, e, f, g, h which are disposed in the region of the area 100, in particular in the corners thereof. The local positioning system device 53 and the active elements 56a-h are configured to cooperate so as to enable a determination of the position.

In alternative exemplary embodiments it can be sufficient for the boundary edge detection device to be able to comprise only the at least one magnetic field sensor, only the satellite position determination receiver, or only the local positioning system device.

Moreover, the autonomous mobile green area maintenance robot 10 has a user control device 70, a user-controlled operation mode, and an operation mode switching device 80 for switching, in particular automatically, between the autonomous operation mode and the user-controlled operation mode. In the user-controlled operation mode, the green area maintenance robot 10 by way of the first motor-driven treatment tool 20 thereof and of the second motor-driven treatment tool 30 thereof is controlled by a user 200 by means of the user control device 70, as can be seen at the top in FIG. 5, and the maximum kinetic energy Ekin2 of the second motor-driven treatment tool 30 is larger than in the autonomous operation mode, in detail larger than 10 Joule.

Figure 3:
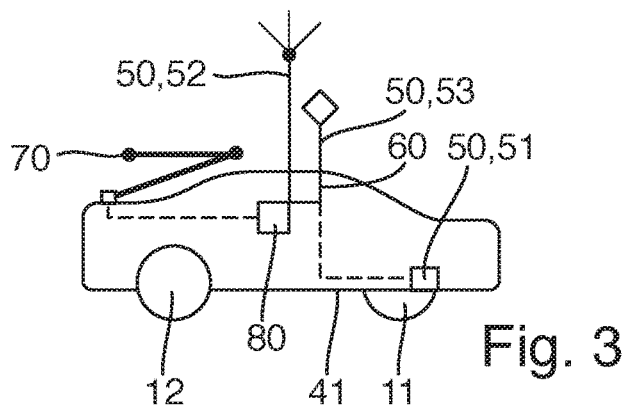
FIG. 3 shows a side view of the green area maintenance robot of FIG. 1.

The user control device 70 in the exemplary embodiment shown comprises a wire remote control unit. The wire remote control unit is movable so as to be adjusted between a control position, as can be seen in FIG. 4, and a storage position, as can be seen in FIG. 3. The operation mode switching device 80 is configured to detect the control position and, in particular as a result thereof, to switch the green area maintenance robot 10 to the user-controlled operation mode, and to detect the storage position and, in particular as a result thereof, to switch the green area maintenance robot to the autonomous operation mode. In detail, the green area maintenance robot 10 comprises an adjustable push bar, and the wire remote control unit is fastened to the latter. The operation mode switching device 80 is configured to detect a position of the push bar, as is illustrated by dashed lines in FIGS. 3 and 4. In the user-controlled operation mode, the user 200 by means of the push bar can push and steer the green area maintenance robot 10, together with the first treatment tool 20 thereof and the second treatment tool 30 thereof, in the control position, and control said green area maintenance robot 10 by means of the user control device 70, as can be seen at the top in FIG. 5.

In alternative exemplary embodiments, the user control device may comprise a remote control receiver for the wireless and/or cable-free control of the green area maintenance robot in its user-controlled operation mode by means of a wireless control connection. The operating mode switching device may, for this purpose, be designed to detect an establishment and/or an interruption of the wireless control connection, and in particular to switch the green area maintenance robot into its user-controlled operation mode and/or into its autonomous operation mode as a consequence of said detection.

Furthermore, the autonomous mobile green area maintenance robot 10 has a drive motor 32. The second motor-driven treatment tool 30 is driven by means of the drive motor 32. The operation mode switching device 80 is designed to restrict a maximum available drive power Pow2 of the drive motor 32 during the switch from the user-controlled operation mode into the autonomous operation mode. Additionally, the operation mode switching device 80 is designed to increase the maximum available drive power Pow2 of the drive motor 32 during the switch from the autonomous operation mode into the user-controlled operation mode.

Moreover, the autonomous mobile green area maintenance robot 10 has a drive motor (not illustrated here) for driving the first motor-driven treatment tool 20. The drive motor 32 for the second treatment tool 30, and/or the drive motor for the first treatment tool 20 can in each case be an electric motor or an internal combustion engine, in particular a petrol engine. Moreover, the green area maintenance robot 10 has a drive energy source (not illustrated) for supplying the drive motors with drive energy. The drive energy source can be an accumulator, a fuel cell, and/or a fuel tank. The drive motors presently are assumed to be electric motors, and the drive energy source is assumed to be an accumulator. In alternative exemplary embodiments it can be sufficient for the green area maintenance robot to have only one single drive motor for driving the first treatment tool and the second treatment tool. The maximum kinetic energy of the second treatment tool can be capable of being set and/or adjusted by way of a clutch and/or a gearbox.

Furthermore provided is a base station 55 for the autonomous mobile green area maintenance robot 10, said base station 55 here being disposed on the boundary edge 101, as can be seen at the left-hand top in FIG. 5. The base station 55 in the exemplary embodiment shown is configured as a charging station for recharging, in particular automatically, the accumulator of the green area maintenance robot 10. The base station 55 furthermore comprises the further satellite position determination receiver 57.

The autonomous mobile green area maintenance robot 10 moreover has front running wheels 11 which are pivotable, and rear running wheels 12 which are driven independently of one another. The autonomous mobile green area maintenance robot 10 can thus move and steer in a self-acting manner on the area 100.

Moreover, the green area maintenance robot 100 has a user guard 33 for protecting the user 200 from product that is cut off and/or ejected by the second treatment tool 30.

As is highlighted by the exemplary embodiments shown and explained above, the invention provides an advantageous autonomous mobile green area maintenance robot which has improved properties, in particular more functions. The autonomous operation mode of the autonomous mobile green area maintenance robot is enabled in particular by the arrangement of the first motor-driven treatment tool in the safety zone, and by the relatively small maximum kinetic energy of the second motor-driven treatment tool. The autonomous mobile green area maintenance robot by means of the first motor-driven treatment tool thereof enables an autonomous treatment of the area to be treated. Additionally, the green area maintenance robot by means of the second motor-driven treatment tool thereof enables an autonomous treatment of the area, in particular treatment of an edge region of the area, in a manner such as is not possible by means of the first treatment tool.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An autonomous mobile green area maintenance robot, comprising:
   a first motor-driven treatment tool,
   a second motor-driven treatment tool differing from the first treatment tool, and
   an open protective housing with a lateral rim,
   wherein the first treatment tool defines a first treatment zone and is arranged within the protective housing such that the first treatment zone is located in a safety zone of the protective housing, the safety zone having a safety distance to the lateral rim,
   wherein the second treatment tool defines a second treatment zone, the second treatment zone being located at least partially beyond the safety zone, and
   wherein the autonomous mobile green area maintenance robot has an autonomous operation mode, wherein in the autonomous operation mode, a maximum kinetic energy of the second motor-driven treatment tool is smaller than a maximum kinetic energy of the first motor-driven treatment tool.

2. The autonomous mobile green area maintenance robot according to claim 1,
   wherein the first motor-driven treatment tool and/or the second motor-driven treatment tool each comprise one or more of: a mowing line, a plastic knife, a metallic knife, or a metallic cutting blade having at least one cutting edge and/or having at least one cutting tooth.

3. The autonomous mobile green area maintenance robot according to claim 1,
   wherein the first motor-driven treatment tool and/or the second motor-driven treatment tool each are a rotating treatment tool.

4. The autonomous mobile green area maintenance robot according to claim 1,
   wherein the safety distance is at least 4 cm.

5. The autonomous mobile green area maintenance robot according to claim 1,
   wherein, in the autonomous operation mode, the maximum kinetic energy of the second motor-driven treatment tool is in a limit range from 5 to 25 Joules.

6. The autonomous mobile green area maintenance robot according to claim 1, wherein the autonomous mobile green area maintenance robot is configured such that, upon contact with an obstacle, the second motor-driven treatment tool draws aside.

7. The autonomous mobile green area maintenance robot according to claim 1, further comprising:
a boundary edge detection device, wherein the boundary edge detection device is configured to detect a boundary edge of an area to be treated, and
a control unit, wherein the control unit is configured to cooperate with the boundary edge detection device and to control a movement of the green area maintenance robot on the area to be treated such that the green area maintenance robot remains on the area to be treated.

8. The autonomous mobile green area maintenance robot according to claim 7,
wherein the control unit is configured to activate driving of the second motor-driven treatment tool upon detection of the boundary edge and, otherwise, to deactivate driving of the second treatment tool.

9. The autonomous mobile green area maintenance robot according to claim 7,
wherein the boundary edge detection device comprises one or more of: a magnetic field sensor, a satellite position determination receiver, or a local positioning system device.

10. The autonomous mobile green area maintenance robot according to claim 1, further comprising:
a user control device,
a user-controlled operation mode, and
an operation mode switching device for switching between the autonomous operation mode and the user-controlled operation mode,
wherein, in the user-controlled operation mode, the green area maintenance robot with its first motor-driven treatment tool and its second motor-driven treatment tool is controlled by a user via the user control device and the maximum kinetic energy of the second motor-driven treatment tool is greater than in the autonomous operation mode.

11. The autonomous mobile green area maintenance robot according to claim 10,
wherein in the user-controlled operation mode, the maximum kinetic energy of the second motor-driven treatment tool is above a limit range from 5 to 25 Joules.

12. The autonomous mobile green area maintenance robot according to claim 10, further comprising:
a drive motor, wherein the second motor-driven treatment tool is driven via the drive motor, and
wherein the operation mode switching device is configured to reduce a maximum available drive power of the drive motor upon switching from the user-controlled operation mode to the autonomous operation mode.

* * * * *